United States Patent [19]

Glisan

[11] Patent Number: 4,761,944
[45] Date of Patent: Aug. 9, 1988

[54] BUSH TRIMMING CATCHER

[76] Inventor: Ronald G. Glisan, 435 Pinehill Dr., Dixon, Ill. 61021

[21] Appl. No.: 60,170

[22] Filed: Jun. 10, 1987

[51] Int. Cl.⁴ .................. A01D 46/24; A01D 46/26
[52] U.S. Cl. ........................................ 56/329; 47/1 R
[58] Field of Search .................. 56/329, 328 R, 327 R, 56/1; 47/1 R, 25, 32, 33

[56] References Cited

U.S. PATENT DOCUMENTS

| 1,058,241 | 4/1913 | Jensen | 56/329 |
|---|---|---|---|
| 1,286,947 | 12/1918 | Creed | 56/329 |
| 1,415,863 | 5/1922 | Boelman | 56/329 |
| 1,445,596 | 2/1923 | Johnson | 56/329 |
| 1,536,167 | 5/1925 | Totten | 56/329 |
| 1,571,298 | 2/1926 | Ravloff | 56/329 |
| 3,490,216 | 1/1970 | Gonzalez | 56/329 |
| 4,573,310 | 3/1986 | Friedel | 56/329 |

Primary Examiner—John Weiss
Attorney, Agent, or Firm—Leon Gilden

[57] ABSTRACT

A bush timming catcher is designed to be positioned around a bush and to catch trimmings cut from the limbs of the bush. The catcher eliminates the difficulty of picking trimmings out of volcanic rock, wood chips, stone and other ground covers. The catcher is formed from nylon or light canvas material which is supported by plastic or light metal tubing. It is expandable in an accordion-like manner to accommodate the size of the bush being trimmed.

1 Claim, 2 Drawing Sheets

BUSH TRIMMING CATCHER

BACKGROUND OF THE INVENTION

1. Field of the Invention

The present invention relates to gardening tools, and more particularly pertains to a portable flexible catcher for bush trimmings.

2. Description of the Prior Art

An ongoing problem that occurs during the trimming of bushes, hedges, and the like, relates to the difficulty of picking trimmings out of volcanic rock, wood chips, stone, and other ground covers which are used under the bushes and hedges. More specifically, as a bush is trimmed, the cuttings tend to fall and collect in the ground cover directly beneath and around the bush. In most cases, it is more difficult to clean up the trimmings than it is to trim the associated bush. Presently, there are no commercially available apparatuses or processes for conveniently collecting and removing trimmings from beneath a bush. As such, there would appear to be a need for such devices whereby the process of collecting and removing trimmings would be greatly expedited and simplified, and in this respect, the present invention addresses this need.

SUMMARY OF THE INVENTION

In view of the foregoing disadvantages inherent in the known types of trimming collection processes and apparatuses now present in the prior art, the present invention provides an improved trimming collection apparatus wherein the same is expandable in an accordion-like manner to accommodate the size of a bush being trimmed and wherein such device conveniently collects trimmings as they fall so as to facilitate their removal in an expeditious manner. As such, the general purpose of the present invention, which will be described subsequently in greater detail, is to provide a new and improved bush trimming catcher which has all the advantages of any prior art bush trimming catchers and none of the disadvantages.

To attain this, the present invention comprises a strip of nylon or light canvas material which is shaped and supported by a plurality of L-shaped rods. When not being utilized, the device may be collapsed in an accordion-like manner to facilitate its storage and transportation. During a usage thereof, the device may be expanded and shaped around the base of a bush, and additional support rods may be utilized to fixedly secure the catcher to the ground. In a modified embodiment, a more rigid structure is used which is joined together by a hinge and is positionable around the base of a bush in a donut-like manner to facilitate the catching and collecting of trimmings.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bush trimming catcher which has all the advantages of the prior art bush trimming catchers and none of the disadvantages.

It is another object of the present invention to provide a new and improved bush trimming catcher which may be easily and efficiently manufactured and marketed.

It is a further object of the present invention to provide a new and improved bush trimming catcher which is of a durable and reliable construction.

An even further object of the present invention is to provide a new and improved bush trimming catcher which is susceptible of a low cost of manufacture with regard to both materials and labor, and which accordingly is then susceptible of low prices of sale to the consuming public, thereby making such bush trimming catchers economically available to the buying public.

Still yet another object of the present invention is to provide a new and improved bush trimming catcher which provides in the apparatuses and methods of the prior art some of the advantages thereof, while simultaneously overcoming some of the disadvantages normally associated therewith.

Still another object of the present invention is to provide a new and improved bush trimming catcher which facilitates the collection of cuttings in an expeditious manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
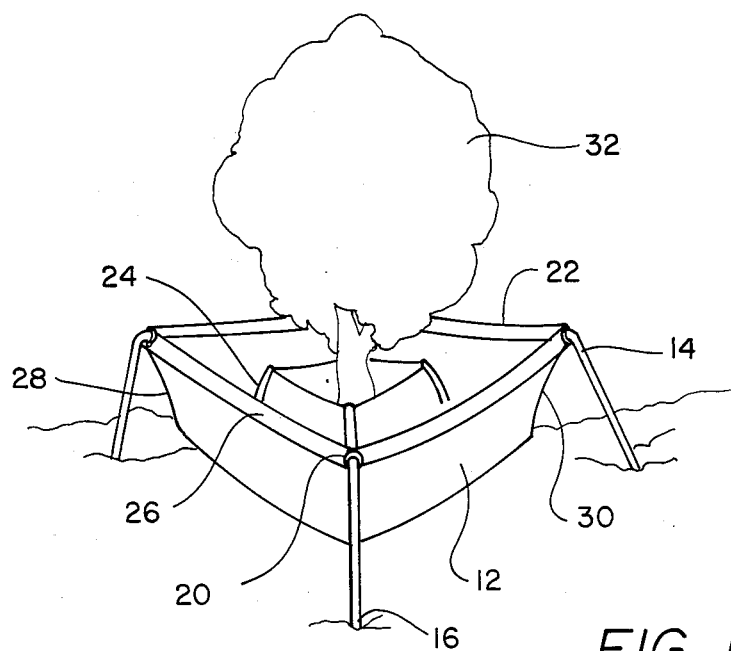
FIG. 1 is a perspective view of the bush trimming catcher comprising the present invention.
Figure 2:
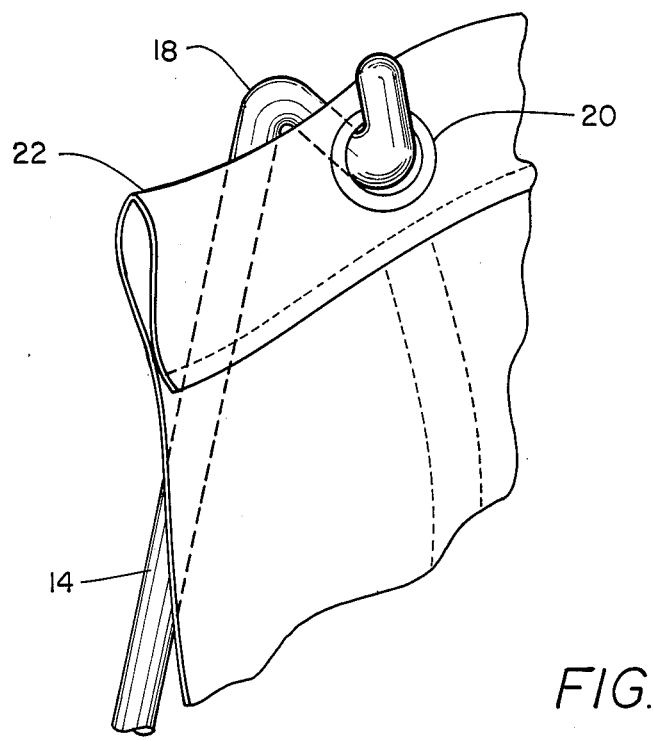
FIG. 2 is a detail perspective view showing one of the support rods associated with the invention.

With reference now to the drawings, and in particular to FIGS. 1 and 2 thereof, a new and improved bush trimming catcher embodying the principles and concepts of the present invention and generally designated by the reference numeral 10 will be described.

More specifically, it will be noted that the first embodiment of the bush trimming catcher 10 as shown in FIG. 1 includes a strip of cloth material 12, such as nylon or light canvas, which is supported in an upright trimming catching position by a plurality of separable support rods 14. Each support rod 14 includes a sharpened end 16 which may be inserted in a ground surface, with the remaining free end 18 being formed in a S-shaped hook to facilitate its positioning within a grommet 20. In this regard, a top edge 22 of the material 12 is overlapped and sewn together to define a reinforced seam structure with a plurality of the grommets 20 then being fixedly secured thereto.

Additionally illustrated in FIGS. 1 and 2 are a plurality of L-shaped rods 24 which may be retained within stitched seams or pockets sewn into the material 12. In the first embodiment 10 shown in FIG. 1, horizontally positioned support rods 26 could be retained within the sleeves 22 so as to give further rigidity to the catcher, and this embodiment of the invention could include a hinge section 28 at one corner thereof with an opposed edge 30 being of an open and releasable construction. As such, the catcher 10 could be fitted around a bush 32 and the support rod 14 could be concurrently inserted through a pair of grommets 20 to effect the secure attachment of the catcher around the bush.

Figure 3:
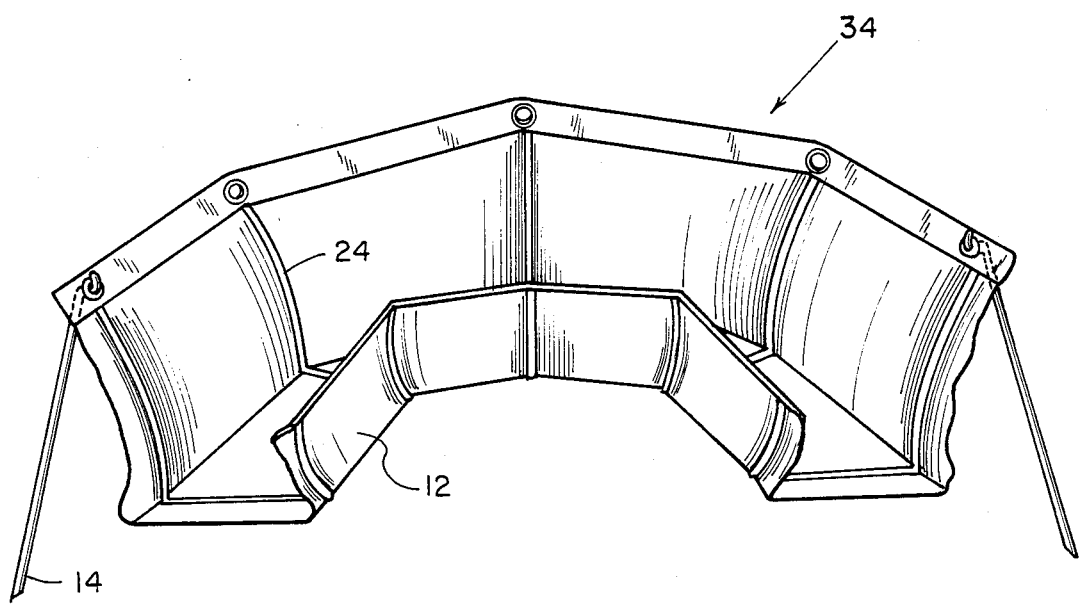
FIG. 3 is a perspective view of a modified embodiment of the invention.

FIG. 3 of the drawings illustrates a modified embodiment 34 of the invention generally designated by the reference numeral 34. This modified embodiment of the invention 34 includes the aforediscussed L-shaped support rods 24 which are sewn into the seam structure of the material 12 and also includes the use of the aforementioned support rods 14. However, as shown in the partial perspective view of FIG. 3, the use of the horizontal support rods 26 has been dispensed with and a greatly increased number of support rods 24 are utilized. This permits the embodiment 34 to be collapsed in an accordion-like manner to facilitate the storage and transporting of the catcher. Additionally, size adjustment is afforded for differently sized bushes inasmuch as the catcher 34 can be expanded to virtually any selected donut-shaped size.

As to the manner of usage and operation of the present invention, the same should be apparent from the above description. Accordingly, no further discussion relative to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved bush trimming catcher comprising:
    trimming catching and collection means formed from a flexible material foldable in an accordian-like arrangement without any rigid skeleton support framework within said collection means, and said collection means including a continuous uninterrupted floor including an inner and outer wall to define a trough therebetween, and
    shape support means for holding said flexible material in a bush trimming catching and collecting shape; said shape support means comprise L-shaped support rods
    and
    position support means for supporting said catcher proximate said bush wherein each of said L-shaped support rods includes first and second substantially parallel aligned arms interconnected by a cross-extending arm substantially orthogonally directed therebetween wherein said position support means includes at least one separable ground engaging rod with said ground engaging rod including a hook on one end thereof for engaging said flexible material, wherein said hook engages a grommet formed in said flexible material.

* * * * *